United States Patent Office 3,372,045
Patented Mar. 5, 1968

3,372,045
ASPHALT COMPOSITIONS AND PROCESS
FOR PREPARING SAME
Lester A. H. Baum, Cherry Hill, N.J., and Leonard Henschel, Flushing, N.Y., assignors to Mobil Oil Corporation, a corporation of New York
No Drawing. Filed Oct. 4, 1963, Ser. No. 313,758
10 Claims. (Cl. 106—279)

The present invention relates to thermal asphalt compositions and to a method for preparing these compositions. More specifically, this invention is directed to the production of thermal asphalts possessing good heat stability and to a simple and effective method for preparing them.

In recent years, the demand for thermal asphalts has significantly increased. Thermal asphalts which are widely used such as in the production of insulating building boards and sheathing, as saturants for fiber sewer pipe, as binders for coal briquettes etc. are generally prepared by the thermal cracking of synthetic tower bottoms from catalytic cracking units such as Thermofor Catalytic Crackers (TCC), or aromatic gas oils.

The stocks normally used in preparing these thermal asphalts are limited in quantity and due to the increased usage of thermal asphalts there is a possibility that the demand for this type of feed stock may exceed the supply. Hence, the production of thermal asphalts from starting materials other than those heretofore employed, especially low cost stocks would be extremely advantageous.

It is therefore an object of the present invention to provide thermal asphalts of excellent thermal stability using relatively inexpensive starting materials.

A further object is to provide a simple, economical process for producing these improved thermal asphalts from inexpensive feed stocks.

Other objects of the invention and some advantages thereof will be apparent hereinafter.

Broadly stated, it has been found that heat stable thermal asphalts can be prepared from blends containing (1) certain resinous pitch materials and (2) selected furfural extract fractions. More particularly, according to the present invention selected proportions of the resinous pitch materials and furfural extracts are blended and subjected to a distillation step to thereby produce the thermal asphalts.

The resinous pitch materials used herein are highly aromatic pitches or tars, which possess low boiling "solvent" fractions but are deficient in high boiling oils which act as plasticizers for the high molecular weight components thereof.

In general, these resinous pitches possess the following characteristics:

Softening point (R. & B.) ° F.: from about 75 to about 140.

Specific gravity (77/77° F.): from about 1.0 to about 1.30.

Conradson carbon percent: from about 25 to 45.

A preferred type of resinous pitch possesses softening points from about 100 to about 130° F., specific gravities in the range from about 1.10 to about 1.20, and Conradson carbon values from about 30 to about 40%.

Particularly desirable resinous pitches of the foregoing type are those obtained as a by-product from the cracking of light crude and distillate in ethylene units used to produce ethylene, propylene and heavier hydrocarbons. This pitch produced in the cracking furnace of the ethylene unit is a solution of a hard brittle-type resinous particles in a fairly low boiling range solvent fraction. A typical analysis of two desirable resinous pitches obtained from this source is given in Table I.

TABLE I

| Resinous Pitch Analysis | (1) | (2) |
|---|---|---|
| Carbon, Percent | 93.5 | |
| Hydrogen, Percent | 5.9 | |
| Atomic C/H Ratio | 1.32 | 1.38 |
| Sulfur, Percent | .34 | .24 |
| Barber Stain | | |
| Specific Gr., 77/77° F | 1.178 | 1.190 |
| Softening Point R. &B., ° F | 122 | 139 |
| Penetration, 100 g./5 sec.: | | |
| 77° F | 28 | 7 |
| 115° F | | 147 |
| Infrared Absorption Index | 1.01 | |
| Infrared Transmission Index | 1.00 | |
| Conradson Carbon, Percent | 31.6 | 36.0 |
| Flash COC, ° F | 390 | 390 |
| Ash, Percent | | .06 |
| Viscosity at— | | |
| 300° F., SFS/cs | 20/42 | 193/411 |
| 350° F., SFS/cs | | 37/79 |
| 400° F., SFS/cs | | 12/26 |
| Solubility in CCl₄, Percent | | 94.97 |
| Solubility in CS₂, Percent | | 99.02 |
| Benzene Insoluble, Percent | 1.63 | |

The furfural extracts used according to the present invention are the petroleum oil fractions produced by the furfural extraction of lubricating oils or catalytic cycle gas oils possessing a high content of aromatic oils and resins. The extract fractions, which are obtained upon removal of the furfural, possess predominant (more than 50 wt. percent) proportions of high boiling aromatic oils, and in general, exhibit the following range of properties:

Viscosity at 210° F., S.U.S.: from about 40 to about 500,
A.P.I. gravity at 60° F.: from about 5.0 to about 20,
Flash point, ° F.: from about 300° to about 625°,
Pour point, ° F.: from 20° upward.

A preferred class of furfural extracts include those possessing an S.U.V. at 210° F., of from about 150 to about 350 seconds, an A.P.I. gravity from about 9 to about 16, a flash point of from about 350 to about 600° F., and a pour point of 80° F. or more.

A particularly desirable furfural extract is obtained from a mid-continent heavy distillate. A typical analysis of furfural extracts obtained from such stocks is shown in Table II.

TABLE II.—FURFURAL EXTRACT

| | |
|---|---|
| Gravity @ 60° F. A.P.I. | 9.3–12.1 |
| Gravity @ 60° F. specific | 0.985–1.005 |
| Flash, ° F. | 465–495 |
| Pour ° F. | 85+ |
| Viscosity @ 210° F., S.U.S. | 120–150 |
| Neutralization No. (max.) | 1.00 |
| Aniline No., ° F. | 90–125 |
| Refractive index at 20° C. | 1.5668 |
| Molecular analysis (Clay-gel) wt. percent: | |
| Asphaltenes | 0.2 |
| Polar resins | 18.0 |
| Aromatics | 61.3 |
| Saturates | 20.5 |
| ASTM Vacuum Distillation (Corrected to atmospheric pressure): | |
| I.B.P. | 714 |
| 10% | 862 |
| 50% | 911 |
| 90% | 961 |
| E.B.P. (97%) | 981 |

The high-boiling aromatic oils supplied by the furfural extract fraction aid in plasticizing and upgrading the resinous pitch thus enhancing the desirable properties of the thermal asphalt product.

The resinous pitch and furfural extract are employed in proportions sufficient to produce blends containing from about 60 to about 90% by weight of the pitch and from about 10 to about 40% by weight of the extract, preferably from about 70 to about 80% by weight of the pitch and about 20 to about 30% of the furfural extract.

Any conventional procedure may be employed for admixing or blending the pitch and the extract fractions.

The heat stable thermal asphalts are produced from the blends of resinous pitch and furfural extract by subjecting these blends to distillation steps. This distillation, preferably a vacuum distillation, serves two functions in that both the undesirable low-boiling "solvent" fractions of the pitch and unwanted paraffinic fractions which are present in the furfural extract are distilled off.

Although the distillation is preferably conducted on the pitch-furfural extract blends, separate distillations of the pitch and furfural extract individually, followed by their reblending in the aforementioned proportions to produce the desired thermal asphalt product is also a suitable procedure. The single distillation of the pitch-furfural extract blend is generally more advantageous because of its economy of operation.

The distillation conditions may vary depending on such factors as the nature of the pitch and furfural extract, the relative proportions employed in the case where these two components are blended before distilling and the characteristics of the thermal asphalt to be produced.

In general, the blends are distilled to the extent necessary to produce a thermal asphalt product possessing the desired softening point. Thus, the particular temperature and other distillation conditions selected depend on the softening point desired and will be apparent to a worker in the art. Distillation under vacuum at temperatures (corrected to 760 mm.) from about 750° to about 850° F. is preferable.

The separate distillations of pitch and furfural extract may be conducted, for example, under vacuum at temperatures (corrected to 760 mm.) of from about 800° to about 950° F., preferably under about 2 mm. of Hg at about 870° F.

The thermal asphalts produced according to the present invention are advantageous in that they are produced from two inexpensive materials of otherwise limited utility. Moreover, these thermal asphalts are extremely desirable products possessing superior heat stability characteristics. These products may be characterized by the following range of properties:

Softening point (R. & B.) ° F.: from about 150 to about 270
Specific gravity (77/77° F.): from about 1.10 to about 1.30
Conradson carbon, percent: from about 25 to about 50.

The following specific embodiments are given to further illustrate the present invention.

Two blends of a resinous pitch and a furfural extract, one containing 30% by weight of the extract fraction and 70% by weight of the pitch and the other containing 20% by weight of the extract and 80% by weight of the pitch are prepared and subjected to a vacuum distillation under 2 mm. (Hg) at temperatures of 750° to 850° F. (corrected to 760 mm. Hg) to produce thermal asphalts of various softening point grades.

The characteristics of these blends as well as the percent weight loss, softening point and penetration values obtained upon heating 50 gram samples thereof at 325° F. for 5 hours is reported in Table III.

The properties of four thermal asphalt samples obtained from the distillation step are then determined and 200 gram samples of these asphalts are subjected to a heat hardening test to measure their thermal stability.

Heat hardening test

According to this test, the 200 gram sample is placed on a seamless tin box and heated to a temperature of 485° F. for 5 hours. The sample is then removed from the tin box and its weight softening point and specific gravity determined. From this data the percent weight loss and softening point increase produced by the heating are obtained.

The properties of the thermal asphalt products and the heat hardening test results are set forth in Table IV.

TABLE III.—PROPERTIES OF BLENDS OF RESINOUS PITCH AND FURFURAL EXTRACT

| | (1) | (2) |
|---|---|---|
| Product, Percent by Wt.: | | |
| Furfural Extract | 30 | 20 |
| Resinous Pitch | 70 | 80 |
| Soft. Point (R. & B.), ° F | 114 | 122 |
| Sp. Gr., 77/77° F | 1.141 | 1.192 |
| Penetration: | | |
| 77/100/5 | 85 | 47 |
| 32/200/60 | 111/2 | 10 |
| Viscosity at— | | |
| 180° F., SFS/cs | 966/2055 | 2137/4547 |
| 210° F., SFS/cs | 219/466 | 416/885 |
| 250° F., SFS/cs | 50/106 | 84/179 |
| 300° F., SFS/cs | 14/30 | 21/45 |
| 350° F., SFS/cs | 7/13 | 8/17 |
| Solubility in— | | |
| CCl₄, Percent | 94.08 | 92.92 |
| CS₂, Percent | 99.12 | 99.15 |
| Flash, COC, ° F | 460 | 460 |
| Evaporation Loss (325° F.-5 hr.-50 g.): | | |
| Percent Loss | 0.99 | 0.87 |
| Soft. Point (R. & B.), ° F | 117 | 126 |
| Pen. 77/100/5 | 58 | 32 |
| Oliensis | Positive | Positive |

TABLE IV.—DISTILLATION OF PITCH—FURFURAL EXTRACT BLEND

| | (1) | | (2) | |
|---|---|---|---|---|
| Blend, percent by Wt.: | | | | |
| Furfural Extract | 30 | | 20 | |
| Resinous Pitch | 70 | | 80 | |
| Product (Thermal Asphalt): | | | | |
| Bottoms, percent by Wt.[1] | 80.2 | 70.3 | 79.8 | 69.6 |
| Distillation Temperature, ° F | 796 | 850 | 761 | 832 |
| Soft. Point (R. & B.), ° F | 176 | 205 | 183 | 225 |
| Sp. Gr., 77/77° F | 1.132 | 1.145 | 1.162 | 1.174 |
| Penetration at— | | | | |
| 130/100/5 | 28 | | 17 | |
| 140/100/5 | 64 | 12 | 38 | 4 |
| 150/100/5 | 130 | 23 | 82 | 11 |
| 160/100/5 | Soft | 46 | 176 | 20 |
| Viscosity at— | | | | |
| 300° F., SFS/cs | 110/234 | | 370/787 | |
| 350° F., SFS/cs | 22/47 | 72/153 | 47/100 | 214/455 |
| 400° F., SFS/cs | 9/17 | 19/40 | 15/32 | 45/96 |
| Solubility: | | | | |
| CCl₄, percent | 94.56 | 93.77 | 92.92 | 92.37 |
| CS₂, percent | 99.09 | 98.91 | 98.61 | 98.67 |
| Flash, COC, ° F | 495 | 520 | 505 | 525 |
| Sulfur, percent | 0.58 | 0.58 | 0.46 | 0.45 |
| Conradson Carbon, percent | 30.2 | 36.5 | 36.2 | 39.4 |
| Heat Hardening (485° F.-5 hr.-200 g.): | | | | |
| Percent Loss | 8.0 | 7.7 | 7.8 | 5.5 |
| Soft. Point (R. & B.), ° F | 217 | 229 | 223 | 225 |
| Soft. Point Increase | 41 | 14 | 40 | 0 |
| Sp. Gr., 77/77° F | 1.146 | 1.149 | 1.176 | 1.174 |

[1] Based on weight of the original blend.

It will be seen from the foregoing data that the thermal asphalts produced according to the present invention exhibit a combination of desirable characterstics, which characteristics are superior to those of either the resinous pitch or furfural extract. The high heat stability of these thermal asphalts as indicated by their small weight loss, low increase in softening point and high flash points is to be particularly noted.

It will, of course, be appreciated that many variations and modifications may be practiced without departing from the spirit and scope of the present invention.

What is claimed is:

1. A process for preparing a heat-stable thermal asphalt which comprises:

blending a resinous pitch material deficient in high-boiling aromatic oils and having a softening point (R. & B.) from about 75° F. to about 140° F., a specific gravity at 77° F. from about 1.0 to about 1.3 and a Conradson carbon number from about 25 to 45%, with a liquid furfural extract containing at least about 50% by weight fo high-boiling aromatic oils, and having a viscosity at 210° F. SUS from about 40 to about 500; an A.P.I. gravity at 60° F. from about 5.0 to about 20; a flash point from about 300° F. to about 625° F.; and a pour point of at least 20° F.; and distilling the resulting blend to produce a heatstable thermal asphalt having a softening point (R. & B.) from about 150° F. to about 270° F.

2. The process of claim 1, wherein said resinous pitch material possesses a softening point (R. & B.) from about 100 to about 130° F.

3. The process of claim 1, wherein said resinous pitch material is obtained from the cracking furnace of an ethylene unit.

4. The process of claim 1, wherein said furfural extract material possesses an S.U.V. at 210° F. from about 150 to about 350 seconds and an A.P.I. gravity at 60° F. from about 9 to about 16.

5. The process of claim 1, wherein said furfural extract material is obtained from a mid-continent heavy distillate.

6. The process of claim 1, wherein said resinous pitch material is blended in predominant proportions.

7. The process of claim 1, wherein said resinous pitch material and said furfural extract material are blended in proportions sufficient to produce blends containing from about 60 to about 90 percent by weight of said pitch and from about 10 to about 40 percent by weight of said furfural extract.

8. The process of claim 1, wherein said resinous pitch-furfural extract blend is vacuum distilled at a temperature from about 750 to about 850° F.

9. The thermal asphalt produced by the process of claim 1.

10. The thermal asphalt produced by the process of claim 5.

References Cited
UNITED STATES PATENTS

| | | | |
|---|---|---|---|
| 2,774,724 | 12/1956 | Watson | 106—279 XR |
| 2,826,507 | 3/1958 | Waddill | 106—284 |
| 2,861,894 | 11/1958 | Franck | 106—279 XR |
| 2,870,080 | 1/1959 | Illman et al. | 106—279 XR |

OTHER REFERENCES

A.P.C. application of Robert Horn, Berlin, Germany, Ser. No. 245,735, published May 11, 1943.

ALEXANDER H. BRODMERKEL, *Primary Examiner.*

J. B. EVANS, *Assistant Examiner.*

UNITED STATES PATENT OFFICE
CERTIFICATE OF CORRECTION

Patent No. 3,372,045                        March 5, 1968

Lester A. H. Baum et al.

It is certified that error appears in the above identified patent and that said Letters Patent are hereby corrected as shown below:

Column 4, TABLE III, second column, line 6 thereof, for "111/2" read -- 11 1/2 --; line 71, for "fo" read -- of --.

Signed and sealed this 8th day of July 1969.

(SEAL)
Attest:

Edward M. Fletcher, Jr.                     WILLIAM E. SCHUYLER, JR.
Attesting Officer                             Commissioner of Patents